(12) United States Patent
Kamvysselis

(10) Patent No.: US 6,687,801 B1
(45) Date of Patent: Feb. 3, 2004

(54) ADAPTIVE COPY PENDING OFF MODE

(75) Inventor: Peter Kamvysselis, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 255 days.

(21) Appl. No.: 09/929,439

(22) Filed: Aug. 14, 2001

(51) Int. Cl.⁷ .............................................. G06F 12/00
(52) U.S. Cl. ..................... 711/162; 711/112; 711/113; 711/161; 711/165
(58) Field of Search ................................ 711/161, 162, 711/112, 113, 165

(56) References Cited

U.S. PATENT DOCUMENTS

| | | | |
|---|---|---|---|
| 5,206,939 A | 4/1993 | Yanai et al. ..................... | 711/4 |
| 5,778,394 A | 7/1998 | Galtzur et al. .............. | 707/205 |
| 5,845,147 A | 12/1998 | Vishlitzky et al. .............. | 710/5 |
| 5,857,208 A | 1/1999 | Ofek ........................... | 707/204 |
| 6,487,561 B1 * | 11/2002 | Ofek et al. .................. | 707/204 |

* cited by examiner

Primary Examiner—Donald Sparks
Assistant Examiner—Mehdi Namazi
(74) Attorney, Agent, or Firm—Choate, Hall & Stewart

(57) ABSTRACT

Transferring data from a local storage device to a remote storage device includes providing a first portion of data to a cache memory of the local storage device, marking the first portion of data as write pending, and, in response to transferring a second portion of data related to the first portion of data prior to the first portion of data being transferred to the remote storage device, transferring the first and second portions of data from the local storage device to the remote storage device. The data may be transferred using RDF format. The first portion of data may be a first block and the second portion of data may be a second block and the first and second blocks may be part of a same sector of data. Transferring the data may also include setting a wpmode flag in response to the first portion of data not being transferred when a request to transfer the second portion of data is made. Transferring the data may also include, in response to the wpmode flag being set, transferring additional data from the local storage device to the remote storage device. The additional data may include data that has also been marked as write pending.

39 Claims, 5 Drawing Sheets

ADAPTIVE COPY PENDING OFF MODE

BACKGROUND OF THE INVENTION

1. Technical Field

This application relates to computer storage devices, and more particularly to communication between computer storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a first storage device, denoted the "primary storage device" (or "local storage device") is coupled to the host. One or more other storage devices, called "secondary storage devices" (or "remote storage devices") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link. The RDF functionality may be facilitated with an RDF adapter (RA) provided at each of the storage devices.

Data that is sent from the primary storage device to the secondary storage device may first be provided in a cache memory of the primary storage device and marked as "write pending" (wp) to indicate that the data is to be sent to the secondary storage device. However, in some instances, it is possible for the data to be marked as wp while the mechanism to send the data to the remote storage device has failed or is delayed. In those cases, the data may never be sent or may be sent too late, even though the data remains in cache marked as write pending. This situation is referred to as a "stuck wp". It would be desirable to address the problem of stuck wp's.

SUMMARY OF THE INVENTION

According to the present invention, transferring data from a local storage device to a remote storage device includes providing a first portion of data to a cache memory of the local storage device, marking the first portion of data as write pending, and, in response to transferring a second portion of data related to the first portion of data prior to the first portion of data being transferred to the remote storage device, transferring the first and second portions of data from the local storage device to the remote storage device. The data may be transferred using RDF format. The first portion of data may be a first block and the second portion of data may be a second block and the first and second blocks may be part of a same sector of data. Transferring the data may also include setting a wpmode flag in response to the first portion of data not being transferred when a request to transfer the second portion of data is made. Transferring the data may also include, in response to the wpmode flag being set, transferring additional data from the local storage device to the remote storage device. The additional data may include data that has also been marked as write pending. The additional data and the first and second portions of data may all be from a same slot. The additional data may include blocks from a sector containing at least one of: the first portion of data and the second portion of data. The additional data may be part of an extant of blocks of a sector containing all blocks of the sector that are marked as write pending. Transferring the data may also include providing a mask indicating which blocks of the extant are write pending. The extant of blocks may include all blocks of the sector. A mask may be provided that indicates which blocks of the extant are write pending. Transferring the data may also include setting a wpmode flag using a system command.

According further to the present invention, computer software that transfers data from a local storage device to a remote storage device, includes executable code that provides a first portion of data to a cache memory of the local storage device, executable code that marks the first portion of data as write pending, and executable code that transfers the first portion of data and a second portion of data, related to the first portion of data, from the local storage device to the remote storage device in response to transferring the second portion of data prior to the first portion of data being transferred to the remote storage device. The data may be transferred using RDF format. The first portion of data may be a first block and the second portion of data may be a second block and the first and second blocks may be part of a same sector of data. The computer software may also include executable code that sets a wpmode flag in response to the first portion of data not being transferred when a request to transfer the second portion of data is made. The computer software may also include executable code that transfers additional data from the local storage device to the remote storage device in response to the wpmode flag being set. The additional data may include data that has also been marked as write pending. The additional data and the first and second portions of data may all be from a same slot. The additional data may include blocks from a sector containing at least one of: the first portion of data and the second portion of data. The additional data may be part of an extant of blocks of a sector containing all blocks of the sector that are marked as write pending. The computer software may also include executable code that provides a mask indicating which blocks of the extant are write pending.

According further to the present invention, an apparatus for transferring data from a local storage device to a remote storage device, includes means for providing a first portion of data to a cache memory of the local storage device, means for marking the first portion of data as write pending, and means for transferring the first portion of data and a second portion of data related to the first portion of data from the local storage device to the remote storage device in response to transferring the second portion of data prior to the first portion of data being transferred to the remote storage device. The data may be transferred using RDF format. The first portion of data may be a first block and the second portion of data may be a second block and the first and second blocks may be part of a same sector of data. The apparatus may also include means for setting a wpmode flag in response to the first portion of data not being transferred when a request to transfer the second portion of data is made. The apparatus may also include means for transferring additional data from the local storage device to the remote storage device in response to the wpmode flag being set. The additional data may include data that has also been marked as write pending. The additional data and the first and second portions of data may all be from a same slot. The additional data may include blocks from a sector containing at least one of: the first portion of data and the second portion of data. The additional data may be part of an extant of blocks of a sector containing all blocks of the sector that are marked as write pending. The apparatus may also include means for providing a mask indicating which blocks of the extant are write pending.

DETAILED DESCRIPTION OF VARIOUS EMBODIMENTS

Figure 1:
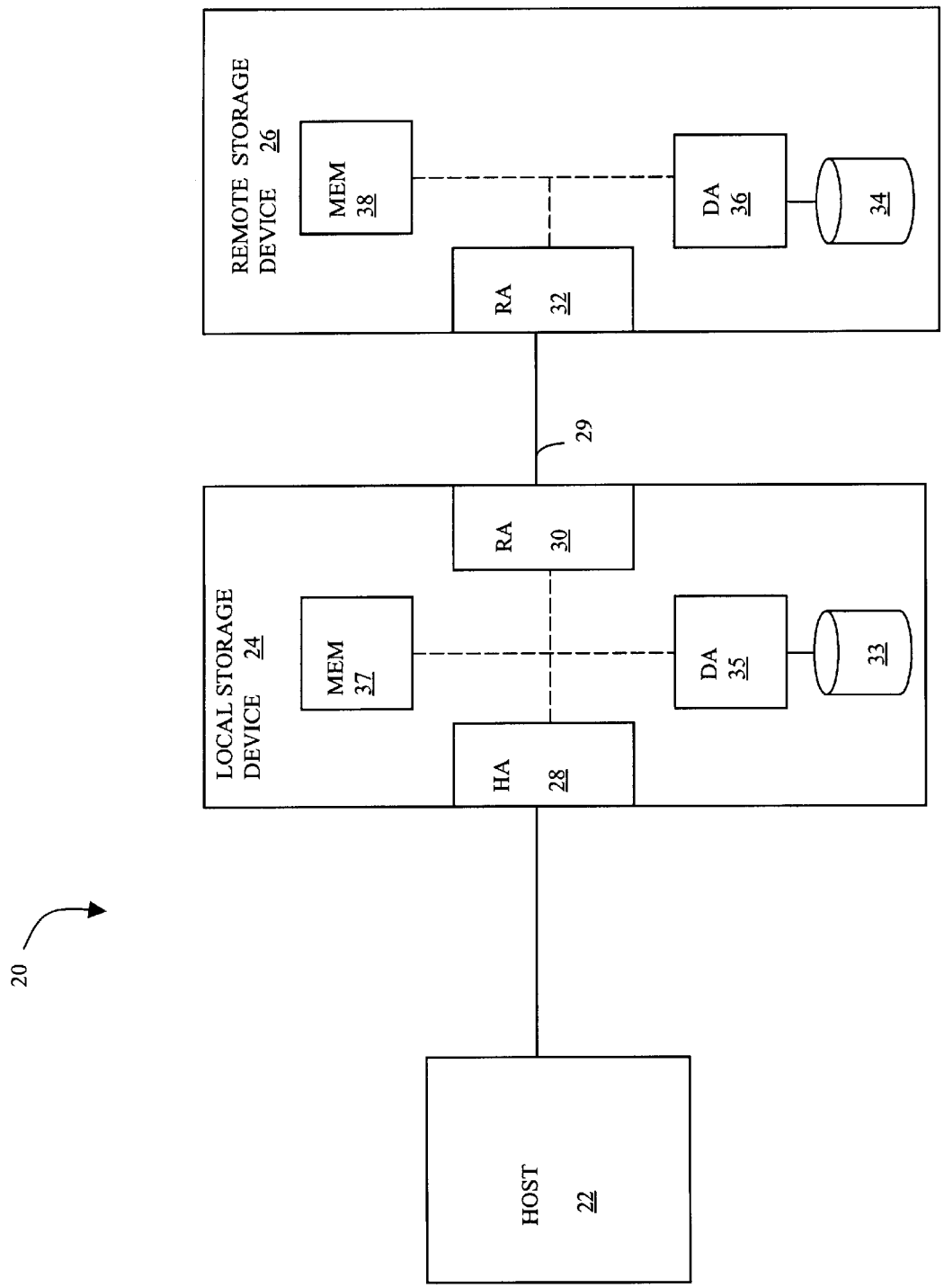
FIG. 1 is a schematic diagram showing a host, a local storage device, and a remote data storage device used in connection with the system described herein.

Referring to FIG. 1, a diagram 20 illustrates data transfer between storage devices using, for example, the RDF protocol, which is described in U.S. Pat. No. 5,742,792, which is incorporated by reference herein. The diagram 20 shows a relationship between a host 22, a local storage device 24 and a remote storage device 26. The host 22 reads and writes data from and to the local storage device 24 via a host adapter 28, which facilitates the interface between the host 22 and the local storage device 24. Data from the local storage device 24 is copied to the remote storage device 26 via an RDF link 29 to cause the data on the remote storage device 26 to be identical to the data- on the local storage device 24. Note that there may be a time delay between the transfer of data from the local storage device 24 to the remote storage device 26 so that the remote storage device 26 may, at certain points in time, contain data that is not identical to the data on the local storage device 24.

The local storage device 24 includes an RDF adapter unit (RA) 30 and the remote storage device 26 includes an RA 32. The RA's 30, 32 are coupled to the RDF link 29 and are similar to the host adapter 28, but are used to transfer data between the storage devices 24, 26. The software used in connection with the RA's 30, 32 is discussed in more detail hereinafter.

The storage devices 24, 26 may include one or more volumes, each containing a different portion of data stored on each of the storage devices 24, 26. FIG. 1 shows the storage device 24 including a volume 33 and the storage device 26 including a volume 34. The RDF functionality described herein may be applied so that the data on the volume 33 of the local storage device 24 is copied, using RDF, to the volume 34 of the remote storage device 26. It is possible that other data of the storage devices 24, 26 is not copied between the storage devices 24, 26 and thus is not identical.

The volume 33 is coupled to a disk adapter unit (DA) 35 that provides data to the volume 33 and receives data from the volume 33. Similarly, a DA 36 of the remote storage device 26 is used to provide data to the volume 34 and receive data from the volume 34. A data path exists between the DA 35, the HA 28 and RA 30 of the local storage device 24. Similarly, a data path exists between the DA 36 and the RA 32 of the remote storage device 26.

The local storage device 24 also includes a memory 37 that may be used to facilitate data transfer between the DA 35, the HA 28 and the RA 30. The memory 37 may contain parameters from system calls, tasks that are to be performed by one or more of the DA 35, the HA 28 and the RA 30, and a cache for data fetched from the volume 33. Similarly, the remote storage device 26 includes a memory 38 that may contain. parameters from system calls, tasks that are to be performed by one or more of the DA 36 and the RA 32, and a cache for data fetched from the volume 34. Use of the memories 37, 38 is described in more detail hereinafter.

When the host 22 reads data from the volume 33 on the local storage device 24, the data from the volume 33 may be first copied into a cache that is provided in the memory 37. For example, an entire track's worth of data may be copied from the volume 33 to the memory 37 in response to the host 22 reading data from one of the blocks of a sector of the track. The track may be, for example, eight sectors and each sector may be, for example, eight blocks, although other arrangements are possible.

The data that is being modified by the host 22 may first be modified in the cache of the memory 37 and then, later, copied back to the volume 33 by the disc adapter 35. If the data that is written to the volume 33 of the local storage device 24 is being mirrored to the volume 34 of the remote storage device 26, then the data may also be sent, using RDF, from the RA 30 to the RA 32 via the link 29. In some embodiments, an entire track's worth of data may be copied. In other embodiments, only an affected sector is sent from the local storage device 24 to the remote storage device 26 using RDF. In other embodiments, only affected blocks, or ranges of blocks, are sent from the local storage device 24 to the remote storage device using RDF.

Figure 2:
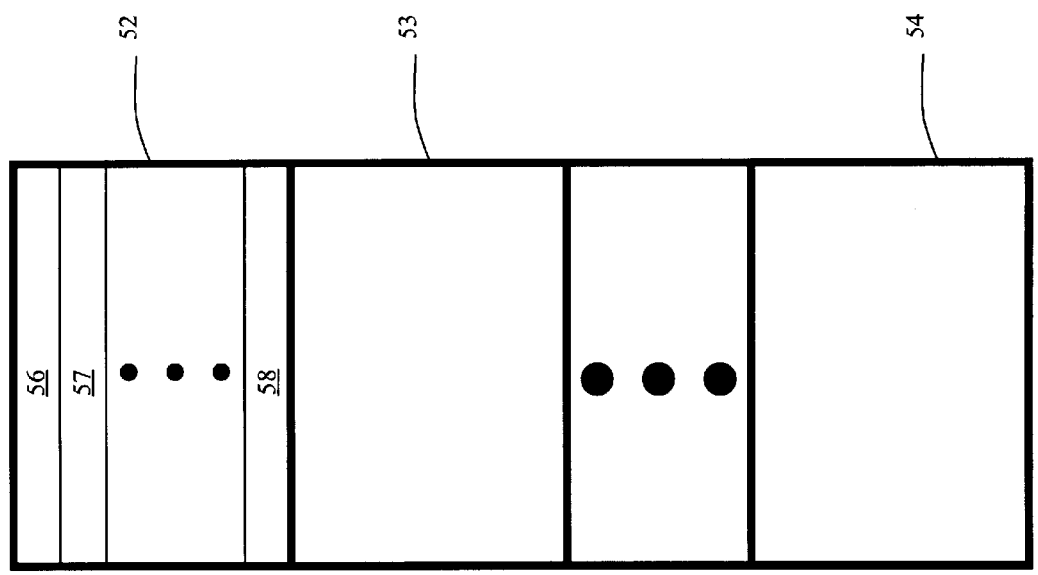
FIG. 2 is a diagram illustrating a slot of a cache memory device used in connection with the system described herein.

Referring to FIG. 2, a diagram illustrates a slot 50 stored in a cache portion of the memory 37. The cache portion of the memory 37 may contain other slots (not shown). The slot 50 may correspond to a track's worth of data on the volume 33. The slot includes a plurality of sectors 52–54. Each of the sectors 52–54 may include a plurality of blocks 56–58, which are illustrated for the sector 52. In one embodiment, there are eight sectors per slot and eight blocks per sector, although other arrangements are possible.

The host 22 modifies data by writing a block's worth of data at a time. In some cases, the host 22 may write a series of sequential blocks. The block(s) that are written by the host 22 are first provided to a slot such as the slot 50. The data may then be copied to the volume 33. Copying data from cache memory to the volume 33 is called "destaging." If the volume 33 of the local storage device 24 is being mirrored using RDF to the volume 34 of the remote storage device 26, the data written by the host may also be copied to the remote storage device 26 using the link 29. In that case, the data may not be destaged unless and until it is copied to the remote storage device 26 and acknowledged as successfully received by the remote storage device 26. Thus, when the host 22 writes data, the data is first provided to the memory 37. The data may be manipulated in the memory 37. Then the data is destaged from the memory 37 to the volume 33 and, in addition, transferred from the local storage device 24 to the remote storage device 26 using the RDF link 29 and the RAs 30, 32.

In one mode of operation (JNRL 0), the host 22 does not receive a write acknowledge from the local storage device 24 unless and until the data has been successfully transferred, using RDF, from the local storage device 24 to the remote storage device 26. Thus, in JNRL 0 operation, the host 22 receives confirmation that the data has been successfully stored on both the local storage device 24 and the remote storage device 26 when the host 22 receives an acknowledgment of the write.

Alternatively, in another mode of operation (JNRL 1), the host 22 receives an acknowledgement for the write as soon as the data is successfully received by the local storage device 24. The local storage device 24 may then transfer the data using RDF to the remote storage device 26 after the acknowledgement has been provided to the host 22. However, in some embodiments, the host 22 is not allowed to write a subsequent amount of data to the local storage device 24 unless and until the previous data has been successfully acknowledged as being received by the remote storage device 26.

Figure 3:
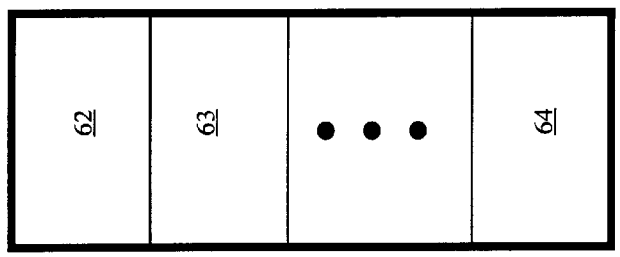
FIG. 3 is a diagram illustrating a table containing entries indicating write pending status for sectors of data stored in cache memory for the system described herein.

Referring to FIG. 3, a table 60 contains a plurality of entries 62–64, each corresponding to one of the sectors 52–54. Thus, for example, the entry 62 may correspond to the sector 52, the entry 63 may correspond to the sector 53, and the entry 64 may correspond to the sector 54. Each of the entries 62–64 may indicate whether at least one of the blocks of a corresponding sector 52–54 is write pending. A block becomes write pending when the block is modified by the host 22 and thus needs to be transferred from the local storage device 24 to the remote storage device 26 using RDF. Thus, for example, the entry 62 may be set to indicate that at least one of the blocks 56–58 is write pending. Once write pending block(s) have been sent to the remote storage device, the appropriate entry in the table 60 is cleared to indicate that the corresponding one of the sectors 52–54 no longer contains a write pending block.

In some instances, the host 22 may attempt to write a block of data to one of the sectors 52–54 that contains another write pending block. If the previously-written block of data has not yet been successfully transferred via the RDF link 29, then writing the subsequent data will cause the write pending indicator for the sector containing the block to be cleared. Note that it may be an error to clear a write pending indicator in connection with writing a second block to a sector prior to writing a first block that is also write pending. For example, if a, first block, block A, is write pending for a sector and then a second block, block B, is subsequently written, it would be an error to clear the write pending indicator for the sector in connection with writing block B prior to writing block A. In addition, this error may become more difficult to avoid if there is an error in the mechanism that causes block A to be written to the remote storage device 26 using RDF in which the error prevents block A from ever being written. Such a condition is referred to as a "stuck wp", where "wp" stands for write pending.

Figure 4:
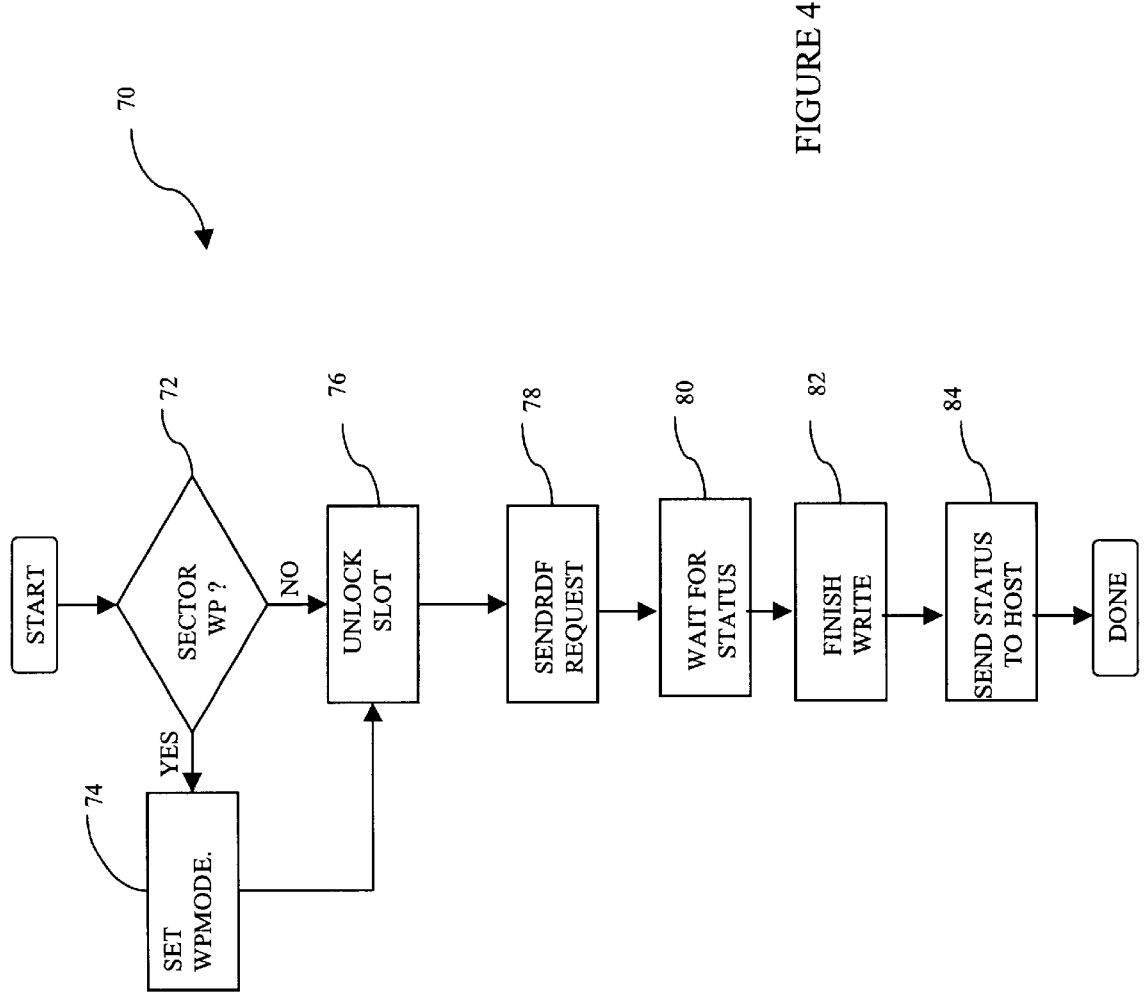
FIG. 4 is a flow chart illustrating processing performed by a host adapter of a storage device according to the system described herein.

Referring to FIG. 4, a flow chart 70 illustrates steps performed by the host adapter 28 in connection with the host 22 writing a block of data to the local storage device 24 where the data is being mirrored to the remote storage device 26 using RDF. Processing begins at a first step 72, where it is determined if the affected sector is already write pending in the cache portion of the memory 37. At the step 72, the indicator corresponding to the affected sector (from the table 60) is examined to determine if at least one block in the sector is already write pending. If it is determined at the test step 72 that the sector is already write pending, then control transfers from the step 72 to a step 74, where a wpmode flag is set. The wpmode flag is discussed in more detail hereinafter.

Following the step 74, or following the step 72 if the affected sector is not already write pending, is a step 76 where the slot corresponding to the sector is unlocked 76. Following the step 76 is a step 78, where the RDF request is sent. The RDF request is provided in a, queue that is also stored in the memory 37 and that is serviced by the RA 30. The RDF request indicates the data to be transferred from the memory 37 to the remote storage device 26 using RDF. Following the step 78 is a step 80, where the host adapter 28 waits for status in connection with the RDF request sent at the step 78. If the RDF connection between the local storage device 24 and the remote storage device 26 is operating in JNRL 0 mode, the wait for status at the step 80 will wait for the data to be sent to the remote storage device 26 and acknowledged as being successfully received by the remote storage device 26. Alternatively, if the local storage device 24 and the remote storage device 26 are operating together in the JNRL 1 mode, then status may be provided at the step 80 prior to the data being successfully transferred to the remote storage device 26. Following the step 80 is a step 82, where the write to the volume 33 is finished by, for example, placing the data on a queue serviced by the disc adapter 35. Following the step 82 is a step 84, where status is sent to the host 22 indicating that the data has been successfully written. Following step 84, processing is complete. Note that, in some embodiments, the host 22 may be provided with an indication that the data was successfully written even though the data is maintained in the cache portion of the memory 37 (i.e., prior to eventual execution of the step 82).

Figure 5:
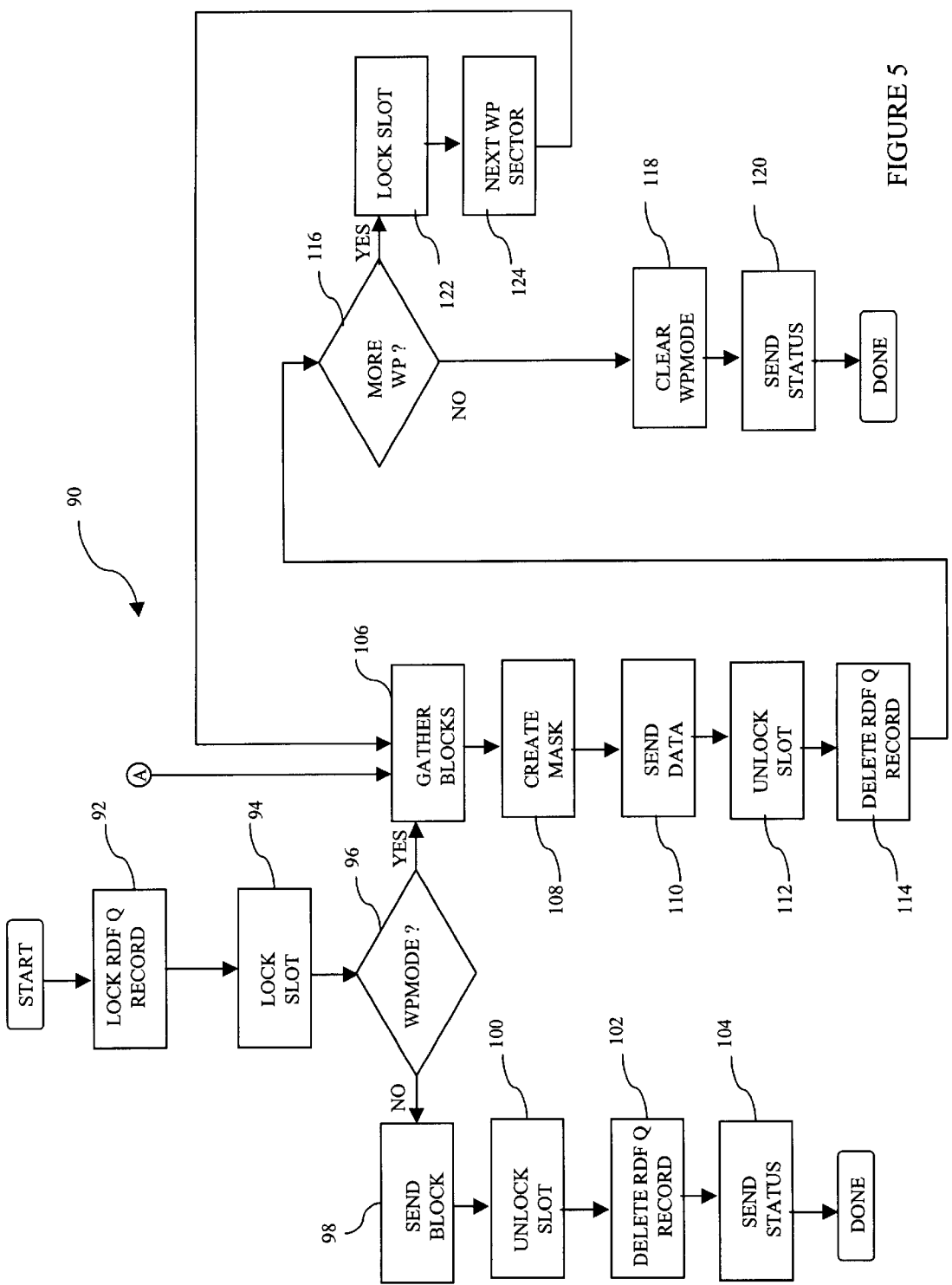
FIG. 5 is a flow chart illustrating processing performed by an RA of a local storage device in connection with the system described herein.

Referring to FIG. 5, a flow chart 90 illustrates steps performed by the RA 30 servicing the RDF queue to send data to the RA 32 via by the RDF link 29. Processing begins at a first step 92, where the RDF queue record is locked. Following the step 92 is a step 94, where the affected slot is locked. Following the step 94 is a test step 96, where it is determined if the wpmode flag is set for the slot. If it is determined at the step 96 that the wpmode flag is not set, then control transfers from the step 96 to a step 98, where the data is sent.

Following the step 98 is a step 100 where the slot is unlocked. Following the step 100 is the step 102 where the RDF queue record is deleted. Following the step 102 is a step 104 where status is sent to the host indicating that the data has been sent to the remote storage device 26. Note that if the data storage devices 24, 26 are using JNRL 0 mode, then the status may be sent to the host at the step 104 after the remote storage device 26 indicates successful receipt of the data. Alternatively, for JNRL 1 mode, status may be provided prior to the remote storage device 26 acknowledging receipt of the data.

If it is determined at the step 96 that the wpmode flag is set, then control transfers from the step 96 to a step 106 where blocks of data for transferring are gathered. Following the step 106 is a step 108 where a mask is created. The steps 106, 108 are discussed in more detail hereinafter. Following the step 108 is a step 110 where the data is sent. Following the step 110 is step 112 where the slot is unlocked. Following the step 112 is a step 114 where the RDF queue record is deleted.

Following the step 114 is a test step 116 where it is determined if there are more sectors for the slot that are write pending. If it is determined at the test step 116 that there are no more write pending sectors for the slot, then control transfers from the step 116 to a step 118 where the wpmode flag is cleared. Following the step 118 is a step 120 where status is sent. Following the step 120, processing is complete.

If it is determined at the test step 116 that there are more write pending sectors, then control transfers from the test step 116 to a step 122 where the slot is locked. Following the step 122 is a step 124 where the next sector of the slot that has a write pending is selected. Following the step 124, control passes back to the step 106 to gather blocks for the sector being processed.

It is desirable to reduce overhead associated with using RDF to send individual blocks of data one at a time for each sector that has blocks that are write pending. In some instances, it may be more efficient to send all of the blocks of a sector at once. Alternatively, it is also possible to send some of the blocks of a sector by selecting the smallest extant of blocks that includes all of the blocks that are write pending. For example, if a sector includes eight blocks and blocks one and five are write pending for the sector, then the gathering blocks at the step 106 could gather blocks one through five (i.e., blocks one, two, three, four, and five). Thus, blocks two, three, and four will be gathered at the step 106 and sent to the remote storage device 26 even though blocks two, three, and four are not write pending. In some instances, sending extra blocks two, three, and four may be more efficient than the overhead associated with sending block one individually and then sending block five individually. In other embodiments, all eight blocks of a sector may be gathered at the step 106 and sent to the remote storage device 26 irrespective of which blocks are write pending for the sector.

The mask generated at the step 108 may be used to indicate which of the blocks that were gathered at the step 106 are write pending. The mask generated at the step 108 may be a single byte where each bit that is set indicates the corresponding block that is write pending. For example, having bits one and five of the mask being set indicates that, of the blocks gathered at the step 106, only blocks one and five are write pending. It is possible to use a value of zero for the mask to indicate that all of the blocks gathered at the step 106 are write pending.

Figure 6:
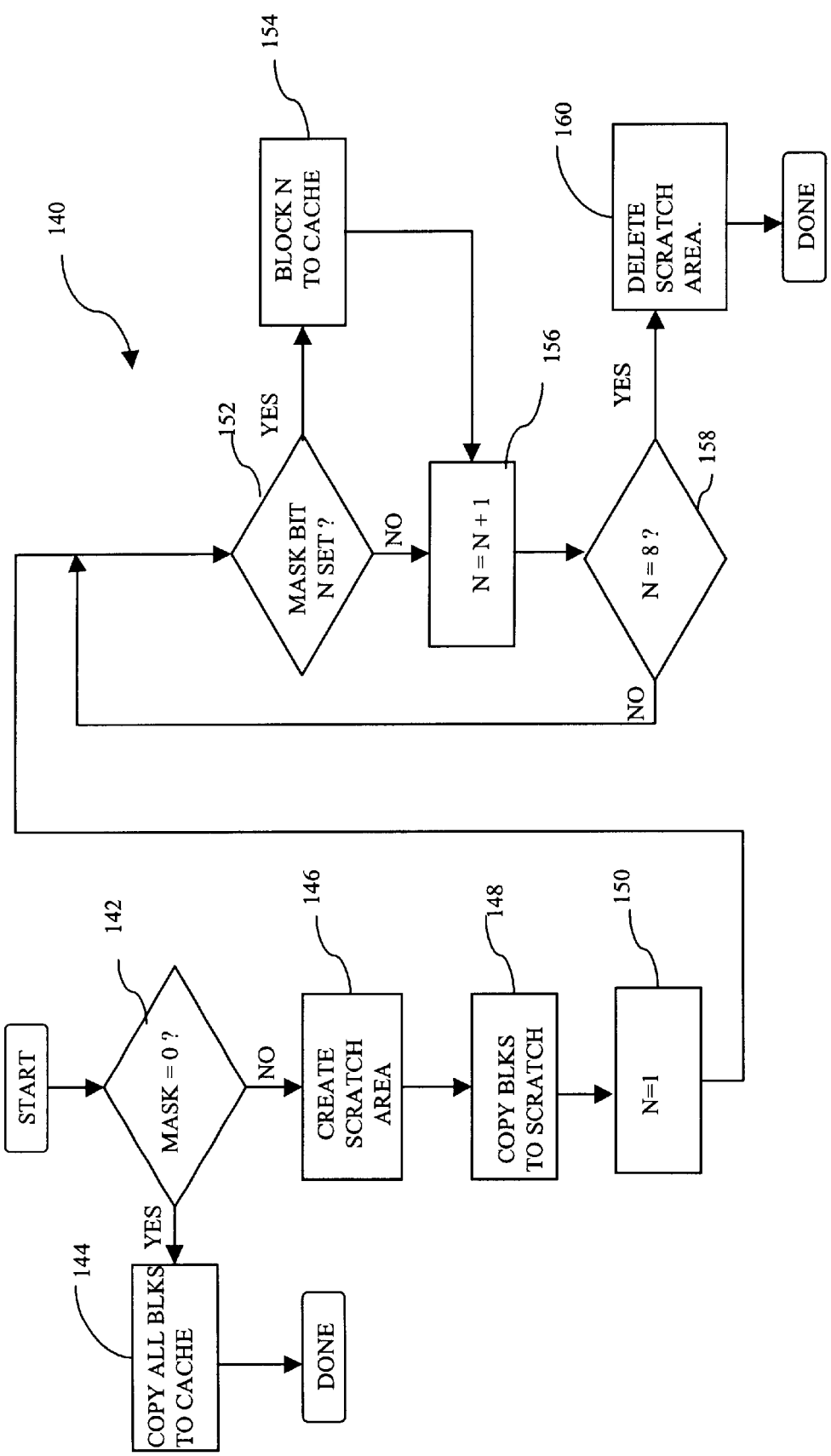
FIG. 6 is a flow chart illustrating processing performed by an RA of a remote storage device in connection with the system described herein.

Referring to FIG. 6, a flow chart 140 illustrates operations performed by the RA 32 of the remote storage device 26 in connection with receiving blocks gathered at the step 106 by the RA 30 of the local storage device 24. Processing begins at a first step 142 where it is determined if the mask created at the step 108 equals zero. If so, then control transfers from the step 142 to a step 144 where all of the data that is sent by the local storage device 24 to the remote storage device 26 is copied to the cache portion of the memory 38 of the remote storage device 26. As discussed above, setting the mask to zero may be used to indicate that all of the blocks gathered at the step 106 are write pending and thus need to be transferred to the volume 34 of the remote storage device 26.

If it is determined at the test step 142 that the mask created at the step 108 does not equal zero, then control transfers from the step 142 to a step 146 where the RA 32 creates a scratch area for the received blocks. Following the step 146 is a step 148 where the received blocks are copied to the scratch area. Following the step 148 is a step 150 where N, an iteration variable, is set to one.

Following the step 150 is a step 152 where it is determined if mask bit N is set. If so, then control transfers from the step 152 to a step 154 where block N is copied from the scratch area to the cache portion of the memory 38. As discussed above, setting mask bit N indicates that block N is write pending. Following the step 154, or following the step 152 if it is determined that mask bit N is not set, is a step 156 where the iteration variable, N, is incremented.

Following the step 156 is a test step 158 where it is determined if the iteration variable, N, equals eight. If not, then control transfers from the step 158 back to the step 152 to begin processing the next mask bit. Alternatively, if it is determined at the test step 158 that N equals eight, then, processing of the mask (and the transferred blocks) is complete and control transfers from the test step 158 to a step 160 where the scratch area created at the step 146 is deleted. Following the step 160, processing is complete.

In some embodiments, it may be possible to manually create a condition to cause write pending blocks to be transferred to the remote storage device 26 by, for example, setting the wpmode flag. This may be desirable in instances, for example, where performance of the local storage device 24 is being impeded by too many write pending blocks. The user may manually initiate clearing of the write pending blocks at the local storage device 24 by, for example, entering a command at the host 26 that is transferred to the local storage device 24 using a system command. The system command may, for example, set the wpmode flag and then cause the RA 30 to being processing at, for example, the step 106 of FIG. 5 by entering the flow at the connector labeled "A" in the flow chart 90.

After write pending blocks are cleared, the local storage device 24 and remote storage device 26 may resume normal RDF operation. This may occur irrespective of whether clearing the write pending blocks is performed manually or performed in response to the HA writing a block to a sector that already has a write pending block associated therewith.

While the invention has been disclosed in connection with various embodiments, modifications thereon will be readily apparent to those skilled in the art. Accordingly, the spirit and scope of the invention is set forth in the following claims.

What is claimed is:

1. A method of transferring data from a local storage device to a remote storage device, comprising:

providing a first portion of data to a cache memory of the local storage device;

marking the first portion of data as write pending; and in response to transferring a second portion of data related to the first portion of data prior to the first portion of data being transferred to the remote storage device, transferring the first and second portions of data from the local storage device to the remote storage device.

2. A method, according to claim 1, wherein the data is transferred using RDF format.

3. A method, according to claim 1, wherein the first portion of data is a first block and the second portion of data is a second block and wherein the first and second blocks are part of a same sector of data.

4. A method, according to claim 1, further comprising:

setting a wpmode flag in response to the first portion of data not being transferred when a request to transfer the second portion of data is made.

5. A method, according to claim 4, further comprising:

in response to the wpmode flag being set, transferring additional data from the local storage device to the remote storage device.

6. A method, according to claim 5, wherein the additional data includes data that has also been marked as write pending.

7. A method, according to claim 6, wherein the additional data and the first and second portions of data are all from a same slot.

8. A method, according to claim 5, wherein the additional data includes blocks from a sector containing at least one of: the first portion of data and the second portion of data.

9. A method, according to claim 5, wherein the additional data is part of an extant of blocks of a sector containing all blocks of the sector that are marked as write pending.

10. A method, according to claim 9, further comprising:
providing a mask indicating which blocks of the extant are write pending.

11. A method, according to claim 9, wherein the extant of blocks includes all blocks of the sector.

12. A method, according to claim 11, further comprising:
providing a mask indicating which blocks of the extant are write pending.

13. A method, according to claim 1, further comprising:
setting a wpmode flag using a system command.

14. A method, according to claim 13, further comprising:
in response to the wpmode flag being set, transferring additional data from the local storage device to the remote storage device.

15. A method, according to claim 14, wherein the additional data includes data that has also been marked as write pending.

16. A method, according to claim 15, wherein the additional data and the first and second portions of data are all from a same slot.

17. A method, according to claim 14, wherein the additional data includes blocks from a sector containing at least one of: the first portion of data and the second portion of data.

18. A method, according to claim 14, wherein the additional data is part of an extant of blocks of a sector containing all blocks of the sector that are marked as write pending.

19. A method, according to claim 18, further comprising:
providing a mask indicating which blocks of the extant are write pending.

20. Computer software that transfers data from a local storage device to a remote storage device, comprising:
executable code that provides a first portion of data to a cache memory of the local storage device;
executable code that marks the first portion of data as write pending; and
executable code that transfers the first portion of data and a second portion of data, related to the first portion of data, from the local storage device to the remote storage device in response to transferring the second portion of data prior to the first portion of data being transferred to the remote storage device.

21. Computer software, according to claim 20, wherein the data is transferred using RDF format.

22. Computer software, according to claim 20, wherein the first portion of data is a first block and the second portion of data is a second block and wherein the first and second blocks are part of a same sector of data.

23. Computer software, according to claim 20, further comprising:
executable code that sets a wpmode flag in response to the first portion of data not being transferred when a request to transfer the second portion of data is made.

24. Computer software, according to claim 23, further comprising:
executable code that transfers additional data from the local storage device to the remote storage device in response to the wpmode flag being set.

25. Computer software, according to claim 24, wherein the additional data includes data that has also been marked as write pending.

26. Computer software, according to claim 25, wherein the additional data and the first and second portions of data are all from a same slot.

27. Computer software, according to claim 24, wherein the additional data includes blocks from a sector containing at least one of: the first portion of data and the second portion of data.

28. Computer software, according to claim 24, wherein the additional data is part of an extant of blocks of a sector containing all blocks of the sector that are marked as write pending.

29. Computer software, according to claim 28, further comprising:
executable code that provides a mask indicating which blocks of the extant are write pending.

30. Apparatus for transferring data from a local storage device to a remote storage device, comprising:
means for providing a first portion of data to a cache memory of the local storage device;
means for marking the first portion of data as write pending; and
means for transferring the first portion of data and a second portion of data related to the first portion of data from the local storage device to the remote storage device in response to transferring the second portion of data prior to the first portion of data being transferred to the remote storage device.

31. Apparatus, according to claim 30, wherein the data is transferred using RDF format.

32. Apparatus, according to claim 30, wherein the first portion of data is a first block and the second portion of data is a second block and wherein the first and second blocks are part of a same sector of data.

33. Apparatus, according to claim 30, further comprising:
means for setting a wpmode flag in response to the first portion of data not being transferred when a request to transfer the second portion of data is made.

34. Apparatus, according to claim 33, further comprising:
means for transferring additional data from the local storage device to the remote storage device in response to the wpmode flag being set.

35. Apparatus, according to claim 34, wherein the additional data includes data that has also been marked as write pending.

36. Apparatus, according to claim 35, wherein the additional data and the first and second portions of data are all from a same slot.

37. Apparatus, according to claim 34, wherein the additional data includes blocks from a sector containing at least one of: the first portion of data and the second portion of data.

38. Apparatus, according to claim 34, wherein the additional data is part of an extant of blocks of a sector containing all blocks of the sector that are marked as write pending.

39. Apparatus, according to claim 38, further comprising:
means for providing a mask indicating which blocks of the extant are write pending.

* * * * *